United States Patent
Morse et al.

(10) Patent No.: US 9,230,029 B2
(45) Date of Patent: Jan. 5, 2016

(54) SYSTEM AND METHOD FOR MODIFYING MEDIA CONTENT PLAYBACK BASED ON AN INTELLIGENT RANDOM SELECTION

(75) Inventors: Lee Morse, Sunnyvale, CA (US); Steven Mark Mosher, Sunnyvale, CA (US)

(73) Assignee: Creative Technology Ltd, Singapore (SG)

(*) Notice: Subject to any disclaimer, the term of this patent is extended or adjusted under 35 U.S.C. 154(b) by 1439 days.

(21) Appl. No.: 11/317,407

(22) Filed: Dec. 22, 2005

(65) Prior Publication Data

US 2007/0025194 A1 Feb. 1, 2007

Related U.S. Application Data

(60) Provisional application No. 60/595,666, filed on Jul. 26, 2005.

(51) Int. Cl.
*G06F 17/30* (2006.01)
*G11B 27/034* (2006.01)
*G11B 27/10* (2006.01)
*G11B 27/32* (2006.01)

(52) U.S. Cl.
CPC .... *G06F 17/30867* (2013.01); *G06F 17/30864* (2013.01); *G11B 27/034* (2013.01); *G11B 27/105* (2013.01); *G11B 27/329* (2013.01); *G06F 17/30286* (2013.01)

(58) Field of Classification Search
USPC .................. 707/723, 727, 728, 769
See application file for complete search history.

(56) References Cited

U.S. PATENT DOCUMENTS

| | | | |
|---|---|---|---|
| 6,766,357 B1 * | 7/2004 | Fandozzi | 709/213 |
| 6,947,922 B1 | 9/2005 | Glance | |
| 7,512,882 B2 * | 3/2009 | Fong et al. | 715/716 |
| 7,685,210 B2 * | 3/2010 | Plastina et al. | 707/805 |
| 2002/0057609 A1 | 5/2002 | Hayashi et al. | |
| 2002/0103796 A1 * | 8/2002 | Hartley | 707/4 |
| 2002/0112227 A1 * | 8/2002 | Kramskoy et al. | 717/148 |
| 2003/0120654 A1 * | 6/2003 | Edlund et al. | 707/7 |
| 2003/0135513 A1 * | 7/2003 | Quinn et al. | 707/102 |
| 2003/0221541 A1 * | 12/2003 | Platt | 84/609 |
| 2004/0064476 A1 * | 4/2004 | Rounds | 707/104.1 |
| 2004/0192306 A1 * | 9/2004 | Elkarat et al. | 455/435.2 |

(Continued)

FOREIGN PATENT DOCUMENTS

WO 2004008460 A1 1/2004
WO 2005106878 A2 11/2005

OTHER PUBLICATIONS

International Preliminary Examination Report; PCT/SG2006/000211, Dated Sep. 20, 2007.

(Continued)

*Primary Examiner* — Hosain Alam
*Assistant Examiner* — Andalib Lodhi
(74) *Attorney, Agent, or Firm* — Russell Swerdon; Desmund Gean

(57) ABSTRACT

A playlist containing a plurality of tracks is filtered to generate a customized subset or window of tracks for playback. The method includes automatically determining user preference data for each of the plurality of tracks based on the user's conduct when each of the plurality is accessed for playback. The tracks in the playlist are reordered after each track is accessed based on the user preference data. A subset of the playlist is selected for playback based on the reordered track arrangement.

20 Claims, 5 Drawing Sheets

(56) References Cited

U.S. PATENT DOCUMENTS

| | | | |
|---|---|---|---|
| 2004/0253945 A1* | 12/2004 | Janik | 455/419 |
| 2005/0021470 A1* | 1/2005 | Martin et al. | 705/51 |
| 2005/0149872 A1* | 7/2005 | Fong et al. | 715/727 |
| 2005/0210101 A1* | 9/2005 | Janik | 709/203 |
| 2005/0249080 A1* | 11/2005 | Foote et al. | 369/59.1 |
| 2005/0262259 A1* | 11/2005 | O'Rourke et al. | 709/231 |
| 2006/0218187 A1* | 9/2006 | Plastina et al. | 707/104.1 |
| 2006/0265421 A1* | 11/2006 | Ranasinghe et al. | 707/104.1 |
| 2007/0162497 A1* | 7/2007 | Pauws | 707/104.1 |

OTHER PUBLICATIONS

Written Opinion of the International Searching Authority, PCT/SG2006/000211, Dated Oct. 30, 2006.

Wareham, William, Playlist Blender page (online), URL: www.visi.com/~bwareham/customsub.html; Last accessed on Apr. 2, 2009.

Klockner, Anreas; Madman Tour page (online), URL: http://mathema.tician.de/software/madman; Last accessed on Apr. 2, 2009.

* cited by examiner

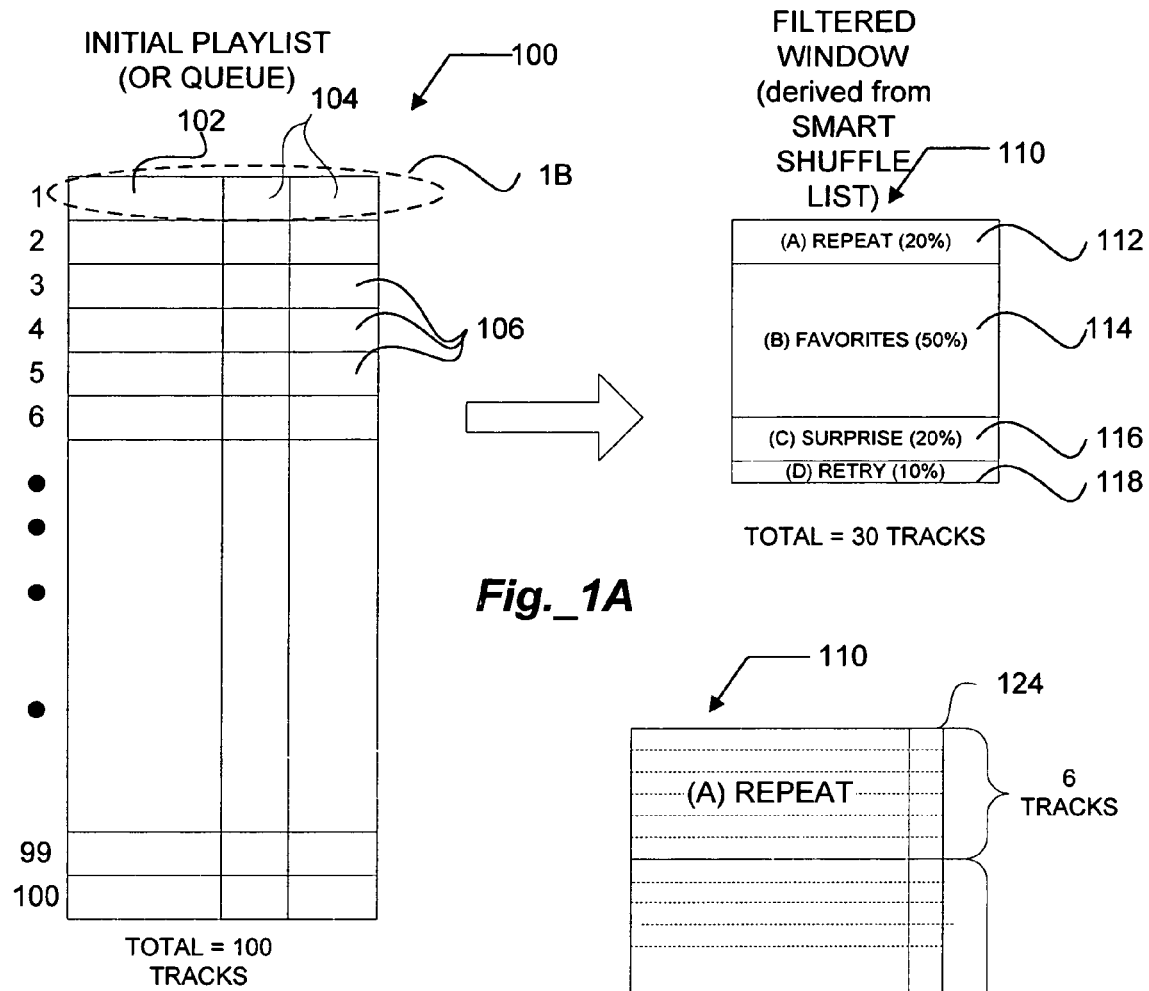
Fig._1A
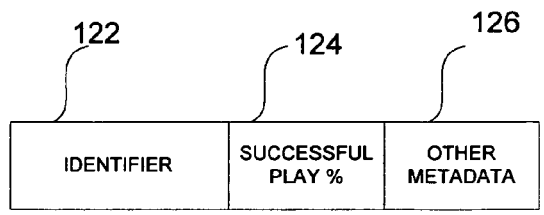
Fig._1B
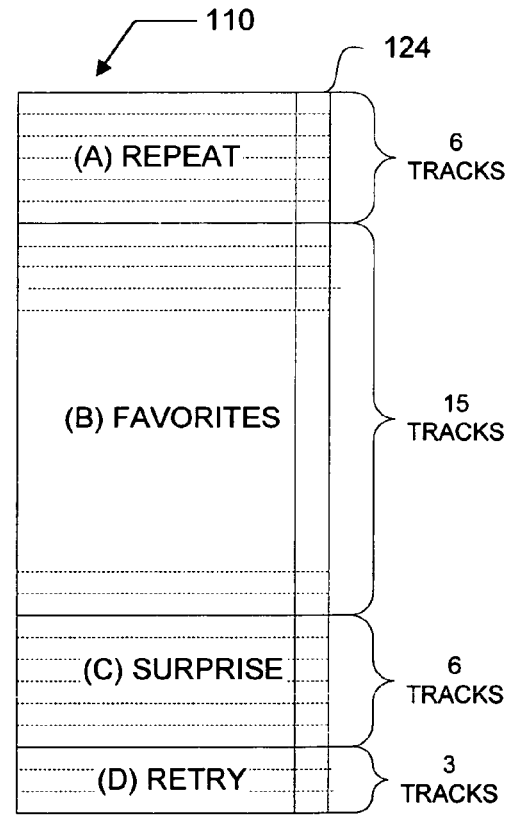
Fig._1C

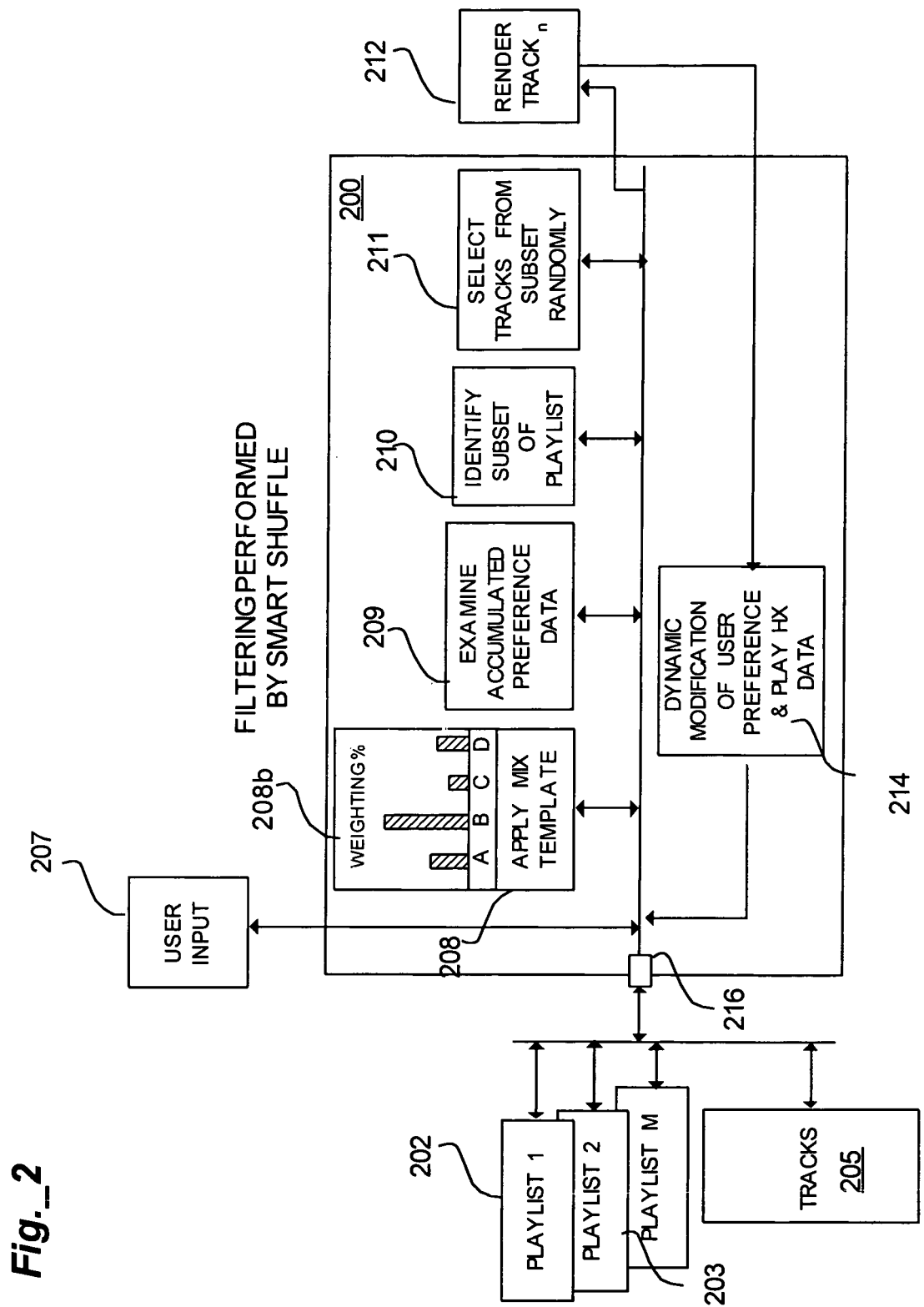
Fig._2

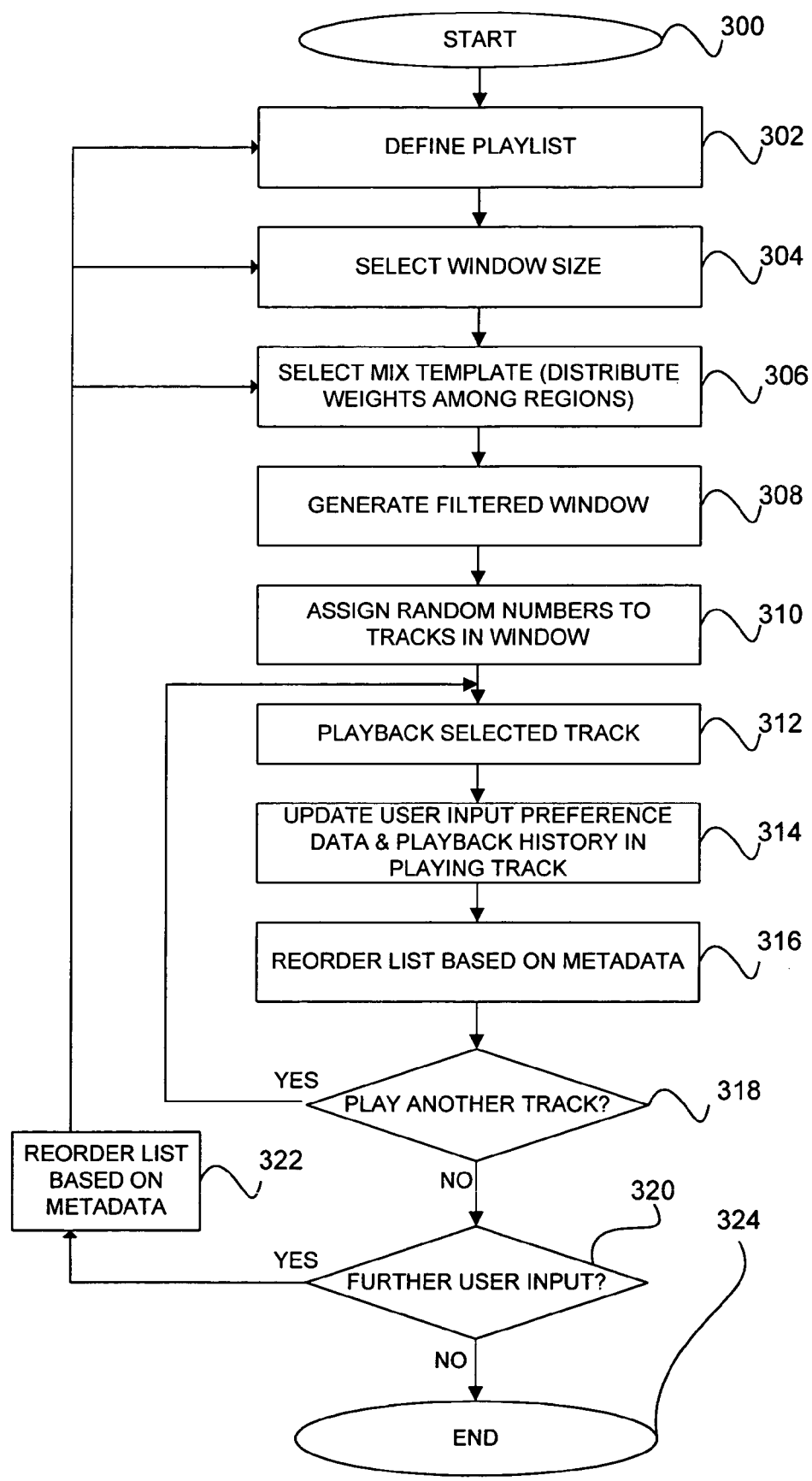
Fig._3

Fig._5A
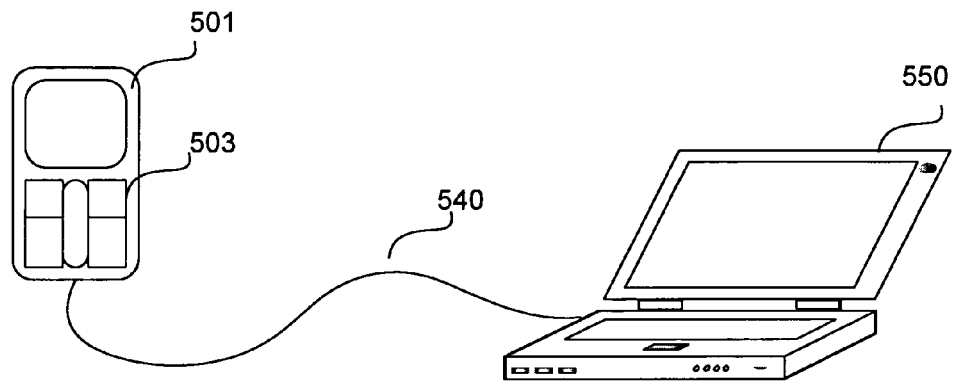
Fig._5B
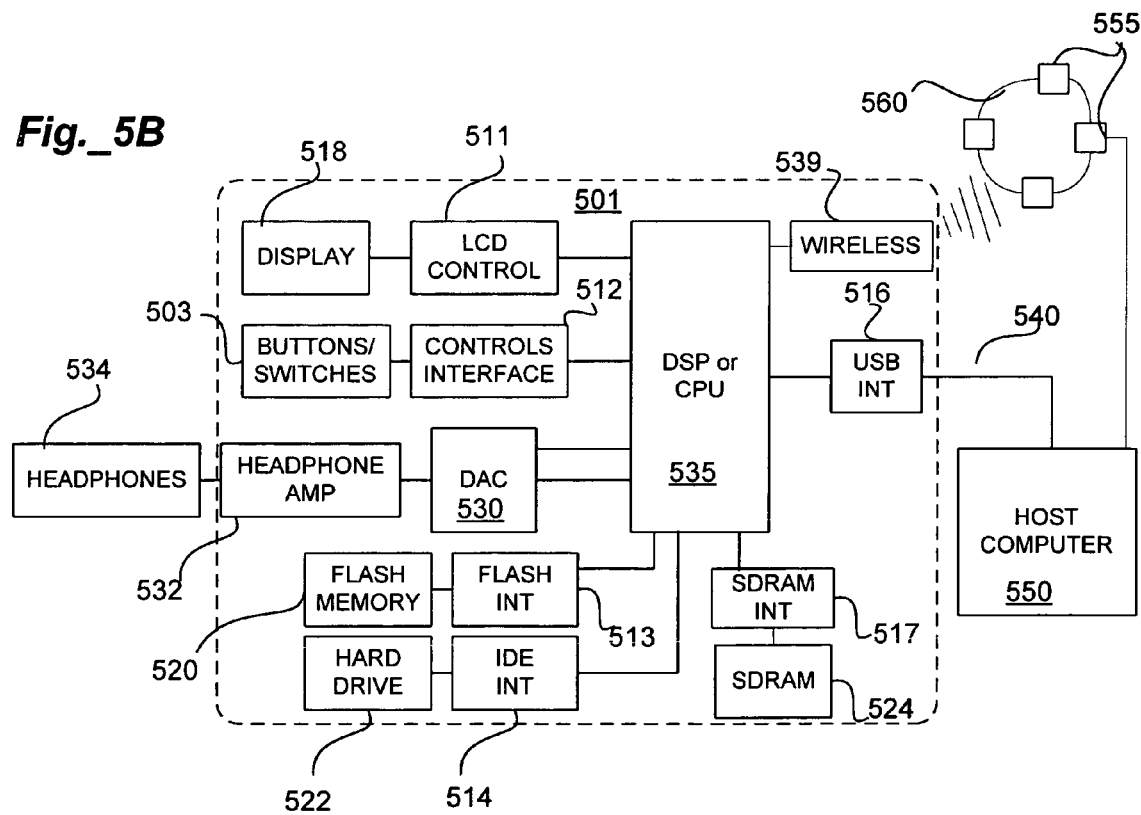

SYSTEM AND METHOD FOR MODIFYING MEDIA CONTENT PLAYBACK BASED ON AN INTELLIGENT RANDOM SELECTION

RELATED APPLICATIONS

This application claims the benefit of U.S. Provisional Application No. 60/595,666, filed on Jul. 26, 2005, the specification of which is incorporated herein by reference in its entirety.

BACKGROUND OF THE INVENTION

1. Field of the Invention

The present invention relates to digital media products. More particularly, the present invention relates to interfaces and methods for accessing and organizing digital music content and other tracks.

2. Description of the Related Art

Digital content has evolved dramatically in terms of scope and prevalence over the past several years. For example, analog sources such as vinyl records played back on turntable playback units have been substantially replaced by portable CD ROM players or personal portable players having MP3 (Motion Picture Experts Group, Audio Layer III) and other audio digital file playback capabilities. Recently, personal portable media players have seen increasing popularity. More recently, portable media players have offered the storage of digital audio files in fixed or removable memory. In order to expand the content available from the fixed capacity of the memory, the digital files are often stored in compressed form and played back by the device after decoding.

As semiconductor process gate lengths have decreased, available memory capacities have increased. In turn, this enables the storage of a greater number of tracks on portable devices. Although improved navigation techniques have permitted users to access individual songs quickly, many users yearn for a simplified experience. One technique that has freed the user from a series of selection activities is the playlist. A playlist is a user defined collection of songs ordered for playback. Many users prefer to organize tracks in accordance with playlists to simplify their experience.

These playlists are often created based on metadata regarding the tracks. For example, applications running on the host computer may allow the user to select attributes for the tracks to be added to a playlist, with the hope that the program selected tracks are found suitable by the user. Unfortunately, many tracks placed into the playlist by these automatic playlist generation algorithms are deemed undesirable by the user. Moreover, the users' interests may change over time with the result that tracks initially favored by the users over time may lose their appeal. Many programs allow the user to access the playlist from the host computer and make manual deletions or additions. But these techniques require an investment of the user's time and reflect the user's views only as current as the last time the host computer's program was accessed.

For users that didn't want to take the time to generate playlists, devices offered 'random' playback options (often called 'shuffle') to mix up the play order of the stored tracks. This too, led to undesired results and a less then enjoyable experience.

It is therefore desirable to provide a method of providing a listing of tracks for playback that tracks the user's preferences in a more dynamic fashion and that doesn't require him to constantly access the host computer to modify playlists.

SUMMARY OF THE INVENTION

The present invention provides a system and method to perform intelligent shuffling of tracks.

In accordance with a first embodiment, a method of identifying tracks for playback from a playlist or queue of tracks is provided. A plurality of tracks is provided in the playlist. User preference data for each of the plurality of tracks is determined based on the user's conduct when each of the plurality is accessed for playback. The tracks in the playlist are reordered after each track is accessed based on the user preference data. A subset of the playlist is selected as a candidate list for playback based on the reordered track arrangement. The tracks are then played pseudo-randomly from the subset.

In accordance with another embodiment, tracks for playback from a playlist of tracks are identified. A plurality of tracks are provided in the playlist. User preference data for each of the plurality of tracks is derived automatically based on the user's conduct when each of the plurality is accessed for playback. A reordered listing of tracks in the playlist is performed after at least one track is accessed. The reordering is based on the user preference data. Further, a track usage attribute reflecting a frequency of access to the track over a predetermined time period is associated with each track. The method further includes selecting a subset of the playlist as candidates for playback based on the reordered listing of tracks and the track usage attribute. In one refinement of this embodiment, the track usage attribute reflects at least one of whether the track has been repeated at least a threshold number of times in the predetermined time period; whether the track has not been accessed in the predetermined time period; and whether the track has been skipped over in the predetermined time period. In another alternative aspect of this embodiment, suitable matching values for the track usage attribute are selected by the user in a playback format template selected through a user interface. The selected subset maybe further processed in a pseudo random playback mode by assigning random numbers to the identified tracks, and thus by providing some weighting to the ordered tracks by providing number limits to the track groupings associated with different categories of the track usage attribute.

In another refinement of the above mentioned embodiment, at least two categories corresponding to separate regions in the subset listing are designated for the track usage attribute and the number of tracks meeting each of the at least two categories is determined by the user before selection of the subset.

In yet another refinement of the first embodiment, the user history in allowing the track to play to completion is deemed approval of the track and the user history in skipping a track is deemed to be a disapproval of the track for setting the user preference data. The attribute identifying the user preference data is a ratio of the number of times the track was successfully played to the number of times the track was accessed for playback.

In another embodiment, a method of identifying tracks for playback from a playlist of tracks is provided. A playlist having a plurality of tracks is provided. A ranking for each of the plurality of tracks in the playlist is determined based on a first attribute associated with each of the tracks in the plurality. A second attribute associated with at least some of the plurality of tracks is used to identify at least one subdivision of the plurality. A region size for the number of tracks in each of the at least one subdivisions is selected. Each subdivision is filled based on the ranking attribute for the qualified tracks meeting the second attribute. In one refinement of this embodiment, the first attribute comprises user preference data for the tracks and the second attribute comprises a playback history identifying a playcount within a predetermined time frame for the tracks. In an alternative embodiment, the first attribute comprises user preference data for the tracks and the second attribute comprises one of a genre or artist associated with the tracks. In yet another embodiment, the method further comprises assigning random numbers to each of the tracks in the subset. Playback occurs in accordance with the assigned random numbers.

In yet another embodiment, a playlist having a plurality of tracks is provided. A ranking for each of the plurality of tracks in the playlist is determined based on a first attribute associated with each of the tracks in the plurality. A second attribute associated with at least some of the plurality of tracks is used to identify at least one subdivision of the plurality. The user preference data is derived automatically from the user conduct in playing or skipping a track.

These and other features and advantages of the present invention are described below with reference to the drawings.

BRIEF DESCRIPTION OF THE DRAWINGS

FIG. 1 is a diagram illustrating ordered playlists in accordance with one embodiment of the present invention.

FIG. 2 is a functional block diagram illustrating a system and method of biasing a track selection in accordance with one embodiment of the present invention.

FIG. 3 is a flowchart illustrating a method of generating intelligent and random playback in accordance with one embodiment of the present invention.

FIG. 5 is a diagram illustrating a system for generating a dynamic playlist in accordance with one embodiment of the present invention.

DETAILED DESCRIPTION OF PREFERRED EMBODIMENTS

Figure 4:
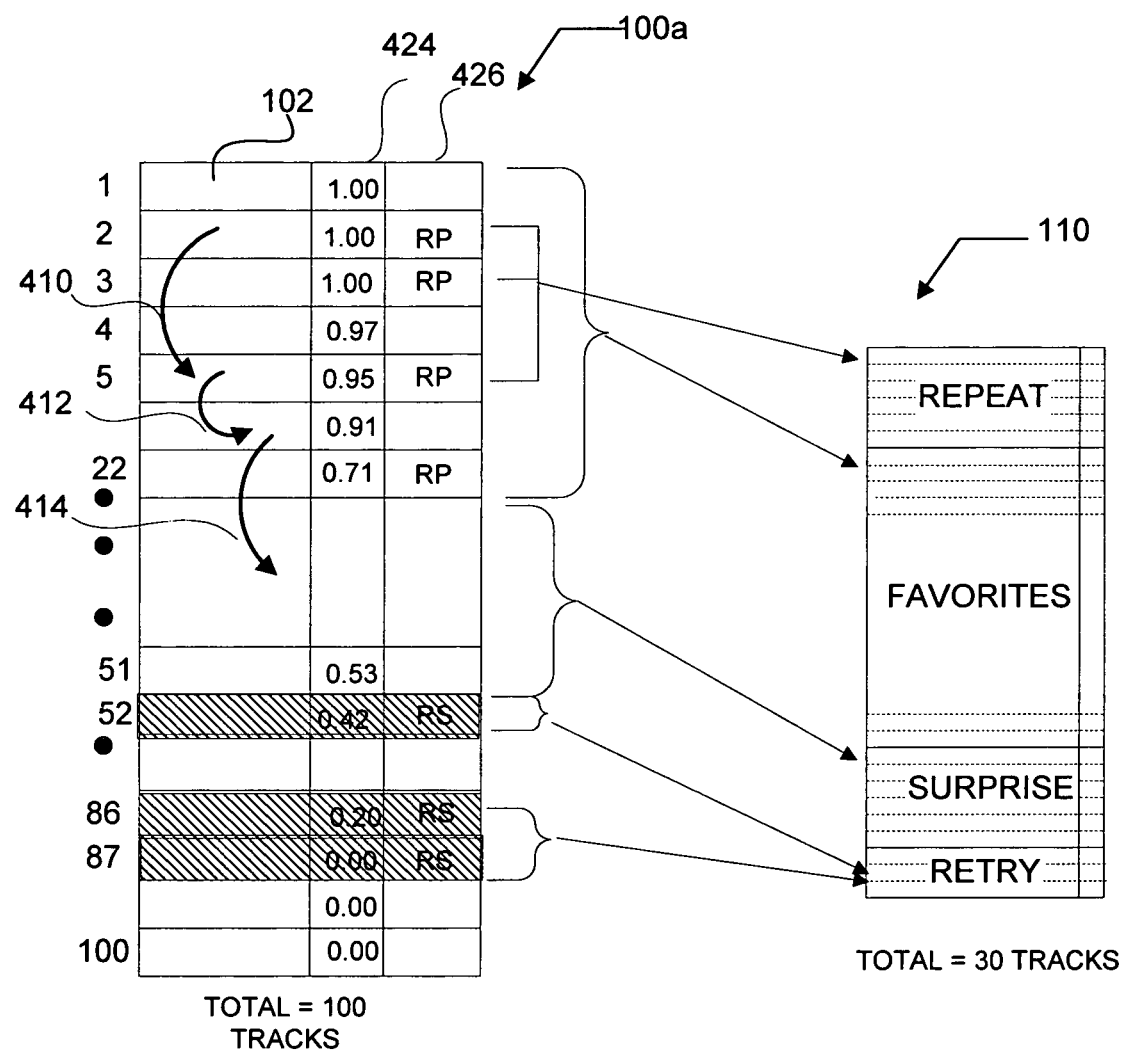
FIG. 4 is a diagram illustrating the creation of a subset of the list in accordance with one embodiment of the present invention.

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known mechanisms have not been described in detail in order not to unnecessarily obscure the present invention.

It should be noted herein that throughout the various drawings like numerals refer to like parts. The various drawings illustrated and described herein are used to illustrate various features of the invention. To the extent that a particular feature is illustrated in one drawing and not another, except where otherwise indicated or where the structure inherently prohibits incorporation of the feature, it is to be understood that those features may be adapted to be included in the embodiments represented in the other figures, as if they were fully illustrated in those figures. Unless otherwise indicated, the drawings are not necessarily to scale. Any dimensions provided on the drawings are not intended to be limiting as to the scope of the invention but merely illustrative. Further to the extent that details as to methods for forming a product or performing a function are illustrated in the drawings, it is understood that those details may be adapted to any apparatus shown in the drawings suitable for performing that function or suitable for configuration using the results of the method as though those same method details were fully illustrated in the drawing containing the apparatus.

In various embodiments of the present invention, a system and method to perform intelligent shuffling of tracks is provided. Shuffling is defined as a simple randomizing of a list. In conventional media players, a random music playback mode is often provided. Tracks are randomly selected from a queue or playlist. Unfortunately, these random playback modes assume that every track or music file in the list is of equal 'interest' to the listener. When the list represents a very large collection (for example, greater than 10 albums), it is more likely that not all the tracks enjoy the same preference level (or 'weight') for that listener.

The present invention provides a method and system for a more intelligent random selection process, one that focuses more on tracks shown to more closely fit the user's recent preferences. This method, referred to herein also as "smart shuffling" or "S-shuffle" provides an improved listener experience by treating the list of music as a dynamic list, which is 'rearranged' based on the listening patterns of the user.

According to one embodiment, a playlist or current queue of tracks for playback is filtered by an intelligent random selection process. In particular, the playback of the queue or playlist is biased towards the playback of certain tracks by generating an ordered smart shuffle (S-shuffle) list from the playlist. Filtering is performed by applying a track selection window to this ordered list, resulting in a subset of the playlist tracks available for playback. The selection window is segregated into definable areas or regions (such as repeat, retry, favorites, and surprise, etc.) that comprise a subset of the playlist or queue. By adjusting the relative sizes of these definable areas in the selection window, a weighting of the user's preferences is achieved. Hence, the specific tracks played upon selection of the smart shuffle mode are derived from the reordering of the smart shuffle list based on user preference metadata and from playback history attributes.

In order to create the smart shuffle ordered list, we start with a defined playlist. We can then play the tracks and create the user preference and playback history data by playback of the tracks 1) in order; 2) randomly; or 3) in accordance with the existing smart shuffle metadata. Initially, according to one embodiment, the music tracks are inserted into the S-shuffle list in a random order when S-shuffle list is created. In other refinements of this embodiment, the order in which the smart shuffle list is initially seeded may take into account other track metadata (like user favorite rating, or billboard ranking). This then pre-seeds the smart shuffle list and improves the overall selection. Then when the list is 'played', the S-shuffle list is opened and a music track is randomly picked to be played. In preferred embodiments, the "weighting" of the playlist or the smart shuffle list results from the use of a track selection window to define a subset of the smart shuffle list.

Following playback, each track is placed near the top of the smart shuffle list. If the user skips the track, the track is instead placed near the or at the bottom of the list. In this way, a "played" list is created with the heaviest weighted tracks at the top (favorites) and the lightest weighted tracks (least favorite) at the bottom. In this manner, the user preference rating is determined automatically and based on the assumption that the user activity in skipping the track, such as before the track completes its playback, is a vote of disapproval for the track (i.e., a negative review). In contrast, allowing the track to complete its playback is deemed an approval rating for the track.

The user may select parameter values that directly affect the focus of the track selection window. In a preferred embodiment, the user selects values for four parameters to control the smart shuffle effect. According to this embodiment, the 4 parameters include (1) the percentage of tracks that are repeated or played multiple times; (2) the percentage of tracks given a retry after being skipped by the user; (3) the percentage of tracks rarely played (i.e., a surprise factor) and (4) the percentage of tracks to choose from when picking a new track. These parameters identify the number of tracks in the track selection window that roughly correspond to defined areas in the smart shuffle list. It should be understood that the smart shuffle list as used herein is preferably a logical list, having the tracks in the playlist ordered according to the first attribute, e.g., user preference data, and preferably having additional metadata associated with the tracks in the list to further enable selection or grouping of the tracks for the track selection window. In this embodiment, the additional metadata includes playback history data. By applying different sizes to different categories of the playback history, the user applies customized weightings to the track selection window.

FIG. 1A is a diagram illustrating ordering of the playlist and deriving a filtered window in accordance with one embodiment of the present invention. As illustrated in FIG. 1A, the initial playlist 100 comprises a plurality of tracks associated with the list. It should be understood that the creation of playlists, queues, or smart shuffle lists may be independent of the actual physical storage of tracks in memory. In fact, playlists are typically files identifying paths to the respective tracks in the playlist. Even with tracks stored in a non ordered manner in memory or even with the segments of a track stored in noncontiguous sections of memory, lists and playlists may be created for organizational purposes that may make it appear that the tracks are ordered consecutively in physical memory. Hence, the lists illustrated in FIG. 1 are intended to show a logical or virtual arrangement and do not necessarily reflect the physical structure of the memory in which the tracks are stored.

The tracks 106 associated with the playlist 100 preferably include an identifier 102 associated with the track and additional metadata or attributes 104 associated with the track. For example, as illustrated in further detail in FIG. 1B, the track metadata may include an identifier (such as a title) 122, a successful play percentage 124, and other metadata 126, such as including the times and number of times the track was played in a predetermined time period along with artist name (and other production metadata). As used herein, the successful play percentage is a measure indicating user preference data over a selected time period. For example, it can be determined manually from the input for one or more users in giving a music track an 'approval' or 'disapproval' vote. More preferably, it is determined automatically by the user's conduct when the track is accessed for playback. For example, if the user allows the track to play to completion when it is accessed for playback, it is interpreted by the program as an approval vote for the track. In contrast, if the track is skipped, for example when accessed and displayed on a screen of a portable media player or interrupted during the course of playback (by the user pressing a "skip" button) this action is interpreted as a disapproval of the track. Alternatively, it can be determined on a collaborative basis from several or more users. Preferably, this user preference data is accumulated and associated with each track. That is, the accumulated user preference data associated with each track enables the ranking of the tracks. Hence, when the corresponding metadata for the tracks in a list is examined, the tracks may be ranked from those having the highest "successful play percentage" at the top of the list and those having the lowest "successful play percentage" positioned at the bottom of the ranking list. It should be understood that the description herein of a ranking list isn't intended to necessarily imply the creation of a physical ranking list in memory of a portable media player or other playback device. Rather, it is intended to illustrate the logical associations that are generated and hence include temporary files generated. Thus, a logical smart shuffle list maybe created that orders the tracks in the initial playlist 100 according to attributes associated with the tracks.

According to this embodiment, a track selection window 110, i.e., a subset or sub list of the initial playlist 100 is generated, preferably as a function of the successful play percentage and other metadata. In a preferred embodiment, selection of the tracks to be included in the sub list, i.e., the filtered track selection window, is further based on other metadata comprising but not limited to the playback history (i.e., a playback history within a selected time period) of the respective tracks. One example of such playback history metadata is a play count within a given time frame, for example the number of times that the track has been played in a predetermined time period such as the last week or month. Alternatively, or in addition, the metadata can include a determination as to when the song was last played. The user preference data is intended to extend to all types, whether automatically or manually derived, including for example the user's explicit preference ratings. The scope of the invention is intended to extend to the evaluation of any other metadata associated with tracks, for example to include any of the fields of ID3 tags (metadata) available from Compact Disc Data Base (CDDB) servers and typically stored with .mp3 tracks. That is, the filtering method may be further applied using categorization metadata such as genre, artist, album, etc. Alternatively still, the filtering method may include other types of metadata such as audio loudness level, tempo, etc. as a basis for identifying tracks for play back.

In the preferred embodiment, the playback history metadata enables a determination as to whether a particular track meets a music format template (mix template) selected by the user. The music format template allows the user to express a customized music playback format by applying different weightings to different playback formats. Preferably these playback formats are associated with the relative repetition of the track in the sequence of played tracks over time. For example, one commonly recognized music playback or playback format is "top 40". This generally refers to the frequent repetitions of the most popular tracks. Another example of a playback format is "fresh" music. These include generally tracks that are rarely heard.

In the embodiment illustrated in FIG. 1A, the user selects a format template that provides different weightings to these playback formats. In this illustration, the repeat category can be deemed analogous to a top 40 format whereas the surprise category can be deemed analogous to a "fresh" music format.

By filtering the playlist 100, the filtered window 110 is provided that reflects the "weights" selected by the user. More specifically, and preferably, the user doesn't directly set each weight but instead selects a 'format template' that has the actual weight values. Hence, the selection of the format template preferably results in a plurality of weightings to be applied to the filtered window by providing a corresponding value for at least two parameters. These values may be selected by selecting a format template from a plurality of templates provided by the manufacturer of the portable device or by any conventional means of entering values for parameters. These customizable parameters can provide the focus between for example the number of repeat tracks (i.e., tracks recently played), percent retry (give another shot for acceptance) and from surprise entries (entries that haven't been played much (low number for the number of times played). By configuring the user interface to allow the user to select from predetermined format templates, the user can change the playback on the fly. That is, the user can dynamically adjust the "weights" applied to the different categories or regions and thereby affecting the playback selection without altering the tracks in the playlist.

The tracks are still randomly selected from the playlist, but only those tracks meeting the criteria for the filtered window (i.e., the selection window) are played. Hence, only a percentage of the playlist 100 gain entry to this subset 110 of the playlist. By altering the parameters to make this subset larger, i.e., a larger percentage of the playlist or queue 100, a more random experience approaching that of the conventional shuffle is achieved. To the extent that the sublist 110 is made small in comparison to the queue, then the greater the impact of the user's customized weightings (the selected format template).

As further illustrated in FIG. 1A, tracks meeting suitable attribute criteria (for example in the selected metadata field associated with each track) are respectively placed in repeat 112, favorites 114, surprise 116, and retry 118 regions of the filtered window 110. The repeat region 112 corresponds to the percentage of tracks that are repeated or played multiple times; the retry region 118 corresponds to the percentage of tracks given a retry after being skipped by the user; the surprise region 116 corresponds to the percentage of tracks rarely played (i.e., a surprise factor) and the favorites region 114 corresponds to the percentage of tracks to choose from when picking a new track.

FIG. 1C illustrates in further detail a sample composition for the filtered window 110 generated from the initial list 100 illustrated in FIG. 1A. By appropriately selecting the playback history (playback history) parameters, the random playback of the smart shuffle mode may be focused on a subset of the initial playlist 100, wherein the subset better reflects the music content currently favored by the user. For illustrative purposes, the initial list of 100 tracks may be filtered to provide a selection window list of 30 tracks by respectively setting sizes for these regions by controlling the parameters corresponding to those regions. In the illustrative example, a weight factor of 20% is applied to set the size (i.e., number of tracks) for the repeat and surprise regions with a weighting factor of 50% applied for the favorites region and 10% for the retry region. This results in the Filtered window (subset) 110 representing the filtering of the initial list 100 (containing 100 tracks) to the 30 tracks shown for the window 110 in FIGS. 1A and 1C. A parameter specifying the size of the selection window 110 can be set separately.

FIG. 2 is a functional block diagram illustrating a system and method of filtering a playlist in accordance with one embodiment of the present invention. The filtering process (i.e., the creation of the smart shuffle list and the selection window) operates on a playlist 202, applies a format template to the tracks in block 208, identifies a smart shuffle subset of the playlist based on user preference data and track usage data in blocks 209 and 210, selects tracks randomly from the subset in block 211, and renders the selected track(s) in block 212. Preferably, the reconfiguration of the smart shuffle list, as denoted by blocks 208, 209, and 210 are all performed in a processor of a portable media player.

The filtering may be performed on any grouping of tracks without departing form the spirit and scope of the present invention. For example, the filtering scheme may be preformed on a single playlist, on multiple playlists from the same user, on a queue of tracks selected for play (temporarily stored but not stored in a more permanent fashion in the system memory) or even on multiple playlists from different users. In the case of multiple playlists, such as playlist 202 and 203 shown in FIG. 2, accessing the two playlists identifies as candidate tracks the aggregate collection of tracks from the playlists and then "ranks" the aggregate list based on one or more criteria. It is preferred that the criteria comprise metadata associated with each track and that the metadata comprise at least user preference data and track playback history data Playlists are typically separate files stored in nonvolatile memory of a playback device or host computer and the preferred embodiment uses playlists in this format. However, the scope of the invention is not so limited but is intended to cover any form of playlists, no matter how stored or generated.

Playlist 1 and playlist 2 are shown accessed from a memory interface 216 by the processor 200. The playlists are shown as separate files from the tracks 205 also stored in the memory of the device. This represents a typical configuration wherein playlists themselves do not contain files but rather provide a table of contents or path to locate the tracks identified in the playlist. Unless otherwise expressed herein, the description of playlists will be treated as logical lists, i.e., with specific tracks contained within the playlist without detailing the physical arrangement between the playlist and the associated tracks. For example, in several embodiments the tracks designated by a playlist will be treated such that metadata (e.g., user preference data and playback history data) will be associated with the playlist, although the structural arrangement details might have the metadata associated with the individual tracks and the playlist merely serving as a table of contents listing to group and locate those tracks. Rudimentary details for methods of generating, storing, and accessing playlists are known in the relevant arts and hence those details will not be provided here.

The processor 200 preferably is configured to perform a number of functions on the playlist 202 in order to render the tracks in a specific sequence. The user input to the processor comprises buttons, switches, or any other type of input device suitable for providing a user selected input to the processor. The user input 207 is important for identifying the particular format template 208b to be applied to the playlist 202 and also, of course, for selecting playlists, tracks, etc. In a preferred embodiment, the manufacture of the portable media player may provide to the user a selection of "mix" or format templates to choose from. These templates would preferably apply different weightings to the different regions of the playlist 202 to give the user a choice of playback formats. For example, the "format template" 208b, showing a plot of the relative weightings (see FIG. 1C for an example of the regions of a playlist and a corresponding alphabetical designation for the region), reflects a heavier weighting to the favorites category (B) as opposed to the repeat (A), surprise (or Fresh) (C), and retry (D) regions. In contrast, a format template focusing more on top 40 tunes would have a heavier weighting in the A category.

The processor 200 is configured to apply the selected format template (208), examine the accumulated user preference data and playback history data (209), and to generate the sublist of tracks (210) (i.e., the filtered window) meeting the criteria selected by the user. These functions together enable the generation of the filtered window from the playlist 202.

The processor 200 also preferably selects tracks from the subset in a random manner (211) and transmits the selection to the track rendering module 212. As known to those of skill in the art, many audio or video tracks are stored in a compressed state and thus require decoding before the digital tracks may be played. Although in the detailed embodiments, the tracks have largely been identified as audio tracks, it should be understood that the scope of the invention is intended to extend to any type of track or media file, including but not limited to video files.

FIG. 2 illustrates a rendering module separate from the processor. In many devices, rendering including particularly decoding is performed by the processor. The scope of the invention is intended to embrace all variants of rendering configurations whether performed in the processor, on-chip, off chip, or even in external devices.

A further function preferably provided by the processor 200 is the dynamic modification of user preference and playback history data (214). In one embodiment, the updating of the track metadata is performed automatically after a track is played. Preferably, the processor is configured to determine automatically whether the track has been "skipped over" by the user before completion of playback. In this way, the system automatically detects whether the user approves of the track (by allowing it to play to completion) or disapproves, interrupting playback before commencement or during playback. In one embodiment, the automatic rating is supplemented through the use of a 'Boost' control to increase the weighting. For example, an extra input button may be included to assist the smart shuffle's learning of the user's preferences. This information is then associated with the track and stored. Alternatively, the user preference data can be entered manually. Preferably, the user preference data reflects an average value, i.e., a percentage of times that the track has been allowed to play to completion divided by the number of times that the track has been accessed. This "successful play percentage" is then used to rank the tracks within the playlist or queue. As will be described in further detail with respect to FIG. 4, ranking enables selection decisions with respect to the placement of tracks within the "regions" of the filtered window.

While the user preference and playback history data can be updated after each track is played or skipped, in one embodiment, the generation of a new customized "smart shuffle list" is performed less frequently. The processor may be configured to respond to selected user inputs to cause the reordering of the smart shuffle list and the generation of the sublist. For example, any of selecting a new format template, adding or deleting tracks from the playlist, playing back of a predetermined number of tracks, or a set period of time from the first time that the smart shuffle list was generated will be sufficient to cause a new filtered window to be generated based on the updated metadata associated with the tracks. That is, any of these events may cause a new filtered window to be generated from the reordered playlist. This initiating event example is illustrative and not intended to be limiting. The scope of the invention is intended to include all forms of initiating events, including but not limited to additional track metadata added, additional tracks added, and selection of a different format template during playback.

FIG. 3 is a flowchart illustrating a method of generating intelligent and random playback in accordance with one embodiment of the present invention. This flowchart depicts in general the process of generating a customized playlist (i.e., a filtered window) from one or more playlists. The process starts at operation 300. First, a playlist is defined at operation 302. The playlist may be a single playlist, or a temporary queue identifying tracks selected by the user for current playback. Further, the playlist may be a plurality of playlists, selected for a single user, or at least one playlist selected for each of a plurality of users. The playlist identifies a listing of tracks that will be subjected to further filtering. The playlist maybe pre-seeded or may correspond to the sequence in the original playlist, e.g., the order in which the tracks were added or listed in the playlist. Next, in operation 304, the window size is selected. This parameter defines the amount of focusing that will be achieved by the smart shuffle process. For example, defining the window size parameter to be 100% will result in all tracks in the playlist being available for shuffling. In other words, setting this parameter to 100% shuts off the filtering. In contrast, setting this parameter to a very low percentage results in a small window and a highly focused smart shuffle sublist. Note that this parameter may be set independently or alternatively derived from other parameters identifying the respective sizes of regions in the filtered window.

In operation 306, the user selects the format template. This enables the distribution of weights among the various regions of the smart shuffle list. As described with reference to FIG. 1C, varying the weightings to a plurality of parameters can dramatically alter the user listening experience. For example, placing a higher weighting on the repeat region (A) parameter would result in a listening experience closer to top 40 programming. Top 40 is both a record chart and a radio format based on frequent repetition of songs from a constantly-updated list of the forty best-selling singles. Hence, placing a higher weighting for this region would result in more tracks selected from this region in the source playlist and hence a higher percentage of the filtered window comprising top 40 tunes.

Next, in operation 308, the subset of the playlist (i.e., the filtered window) corresponding to the selected parameters is generated. It should be understood that the scope of the invention is intended to cover all variations of creating or identifying the subset corresponding to the filtering. That is, in some cases, an entire file maybe created and stored to identify the filtered window. In other situations, only a temporary file may be created identifying the specific tracks that meet the criteria and form the sublist. The scope of the invention is intended to embrace any and all of these variations.

Next, in operation 310, random numbers are assigned to the tracks in the filtered window. Conventional methods for generating random numbers and applying them to entries in a listing are known in the arts and hence further details will not be provided here. Next, in operation 312, a track is selected for rendering and playback, based on the random number generation step described. For example, the method as illustrated in FIG. 1 narrows a playlist of 100 tracks to 30 tracks as a result of the filtering. A number is generated randomly for each track and the tracks are played back according to that random number and optional additional metadata values. Next, in operation 314, the metadata pertaining to the track is updated. This metadata will depend in the preferred embodiment on whether the track is played to completion (i.e., a user approval) or skipped, a user disapproval). Further, the processor preferably is configured to recalculate the successful play percentage for that track. Next, in operation 316, an optional reordering of the listing of tracks is performed. In alternative embodiments, the device can be configured to reorder the tracks after each access of the track. Preferably, however, the reordering of the tracks based on the metadata will occur less frequently, i.e., only upon the occurrence of the initiating events defined for the device. Specific examples of initiating events have been described above.

Next, a determination is made in operation 318 as to whether there are further tracks to play. That is, a determination is made as to whether there are further tracks in the filtered window. If so, the flow proceeds to step 312 to render those tracks. If not, the system proceeds to determine in operation 318 if further user input is received. If so, in one preferred embodiment, the playlist is reordered (322) according to the updated metadata provided since the last reordering of the list. Depending on the input type, the process flow can be redirected in operations 302, 304, or 306. That is, if the user is adding to the playlist, flow proceeds to operation 302. If the user is selecting another format template, the process flow proceeds to operation 306. If no further input is received, the process ends at step 324.

FIG. 4 depicts the generation of a sublist 110 based on the playback history (function of time) and user preference data. More specifically, the diagram illustrates the generation of a subset of the list by filtering the smart shuffle list 100a. In a preferred embodiment, the user may adjust the values of 4 or more parameters to control the smart shuffle process. The 4 parameters include the percentage of tracks that are repeated or played multiple times; the percentage of tracks given a retry after being skipped by the user; the percentage of tracks rarely played (i.e., a surprise factor) and the percentage of tracks to choose from when picking a new track. By using these parameters to control the relative sizes of the regions of the filtered window 110, the playlist 100a can be filtered to provide the listener with a more customized listening experience.

The method involves a learning or playback experience. The list 100a may be accessed initially in a random manner, manually selecting tracks, or even by playing the tracks in the playlist in sequence according to their order in the playlist 100a. As discussed earlier, the user preference data reflects how the user has favored the track during the playback history. Approvals and disapprovals by the user are recorded as track metadata. More particularly, in one embodiment, the user preference data is rewritten to indicate the higher successful play percentage resulting from the recent playback and a reordering of the playlist based on the successful play percentage 424. These dynamic changes to the track's metadata will generally cause a track successfully played to be placed towards the top of the smart shuffle list 100a. In contrast, if the user skips the track, the change in the successful play percentage will cause the track to be placed near or at the bottom of the list 100a. In this way, a "played" list is created with the heaviest weighted tracks at the top (favorites) and the lightest weighted tracks (least favorite) at the bottom. It should be understood that at the start of this training experience the tracks will have little or no associated user preference data and hence positioning of the tracks within the playlist ranking will feature wider swings, for example, if a successful playback is followed by a skipping of the track. As the playback history grows, the changes will typically be more incremental and the dynamic rewriting of the metadata will cause more of a migration of a track towards either the top or the bottom of the smart shuffle list 100a, if no effort is used to pre-order the list based on other track metadata.

FIG. 4 illustrates the smart shuffle list 100a ranked according to the user preference metadata column 424 and also having associated with each track recent playback history metadata 426. For example, track 2 has associated therewith a successful play percentage of 1.00 and an "RP" (recently played) indication. This metadata would likely result in the track positioned in the "Repeat" region of the filtered window 110. According to one preferred embodiment, the smart shuffle selection algorithm identifies those track as recently played and fills the available slots with those tracks having the highest ranking (according to the successful play percentage metadata 424). For example, as illustrated in FIG. 4, tracks 2, 3, and 5 would be among the candidates for the "Repeat" region in the filtered window 110. In a similar fashion, the favorites section would include the highest-ranking tracks from the playlist 100 that hadn't been placed in the repeat region. Hence, a track that had in the recent past enjoyed repeated successful play, for example a top forty type selection, would start to migrate from the "Repeat" region to the favorites region once the track was rejected one or more times.

The directional arrows 410, 412, and 414 show an example of a migration. That is, upon its first rejection, a high ranking track could, hypothetically and according to this embodiment, migrate from the second position on the list to the $5^{th}$ position shown by transition arrow 410. A further rejection (skipping) of the track might result in the transition 412 to a 10th ranking or so on the list (coupled with metadata 426 indicating that it no longer met the recently played (RP) criteria) and a further dropping in ranking to the 25th position or so upon further skipping or upward migration of other tracks in the playlist 100. It should be understood that the effect of the dynamic reassessment of metadata would generate corresponding shifts of the track in the filtered window list 110, that is, from the Repeat region to the Favorites region. It should be noted that no "Repeat" or "Favorites" region has been illustrated for the smart shuffle list 100a. It should be understood that generally these regions will correspond to the same ordering of regions in the filtered window 110. However, their boundaries in the ordered playlist (smart shuffle list 100a) are less distinct. Preferably, a determination as to whether a track meets the criteria for the filtered window is made upon determination as to whether the tracks in the playlist have associated metadata fields each matching the selected criteria.

A somewhat similar migration occurs in the smart shuffle list 100a and the filtered window list 110 when a track is skipped. In this embodiment, the track is repositioned to the end of the smart shuffle list and inserted into the 'retry' region. Based upon the particular set of user preferences being used, the track might be played again at a later date or never offered for playback again.

Generally, due to the smaller size of the filtered window list, the dynamic reordering of the smart shuffle list 100a will have a more dramatic effect on the filtered window list 110, causing, for example, a track to migrate from the repeat to the favorites region to out of the filtered window 110. A random selection algorithm is still used, as is available with conventional playlist playback modes, but instead the random selection is a function of the weights applied.

FIG. 5 is a diagram illustrating a system for generating a dynamic playlist in accordance with one embodiment of the present invention. In particular, FIG. 5A illustrates a portable media player 501 connected to a host computer 550 for the downloading of tracks and/or playlists and/or associated metadata. The devices are connected to each other for transmission of digital data by any conventional means, for example, including a USB cable 540. As known to those of skill in the relevant arts, playlists may be created on a host computer. Typical application programs facilitate the generation of a track library on the host computer and often allow the creation of playlists that group selected library tracks. The playlists are then downloaded to the portable media player 501 along with the tracks. Alternatively, playlists may be generated entirely on the portable media player.

The host computer 550 also often includes a media player application program wherein playlists and individual tracks can be played back using the resources of the host computer, for example for audio tracks using the host computer's sound card and attached speakers or headphones. The methods described herein for filtering a playlist to generate a smart shuffle playlist and a weighted selection window are preferably applied to a portable media player such as portable media player 501. However, the scope of the invention is intended to extend to the filtering of playlists on any device configured to use playlists, such as including playback on a host computer 550 or even using a combination of track metadata on a host or other networked computer to generate a smart shuffle list for playback on an attached portable media player.

In the preferred embodiment, the portable media player 501 is configured to receive the user preference data such as through buttons or switches 503 located on the player 501. FIG. 5B illustrates further details of a portable media player 501 connected to a host computer 550 and configured to perform the smart shuffle filtering methods described. Preferably the processor 535 is configured to receive user inputs from buttons/switches 503. The user interface will rely on both the display 518 to display playlists, format templates, and other options to the user and the buttons switches to allow user input among the displayed options. The processor is further configured to access nonvolatile memory 520 (flash memory) or 522 (hard drive) for the storage of tracks, playlist files, and associated metadata, such as user preference data and playback history data. In one embodiment, the portable device 501 is further configured to access non-local files such as network based files. For example, these may be accessed through the device's connection 540 to the host computer, which in turn, is connected to servers 555 connected in a network 560. The servers may contain, for example, archived media files available to the public or merely to subscribers, or some combination thereof. Alternatively, the portable device 501 may be connected directly to the network based files, such as through a wireless interface 539.

The processor 535 is also preferably configured to render the tracks located in nonvolatile memory for playback. The tracks are then converted using digital to analog converter 530 and fed to the headphones 534. As can be appreciated by those of skill in the relevant arts suitable interfaces are required between the processor 535 and the display, user input device, and memory. These include, for example, the LCD control interface 511, controls interface 512, flash memory interface 513, IDE interface 514, and SDRAM interface 517. Transmission of data to and from the host computer 550 is effectuated using USB interface 516. Since details as to suitable interfaces are known to those of skill in the relevant arts, further details will not be provided here.

By providing dynamic reordering of a playlist as a function of the approval or disapproval actions of the user, a customized and random playlist can be generated. Since the dynamic reordering takes place preferably as a result of normal user reactions, i.e., allowing the track to play to completion or skipping a track, the user's evolving tastes are reflected in the smart shuffled playlist.

According to yet another embodiment, the processor is adapted to change a smart playlist format template while playing. That is, the weights are updated based upon the user approval or disapproval and when the current playing track completes, the next track is selected based upon the new updated weights.

The foregoing description describes several embodiments of filtering a playlist to generate a more customized playback of tracks. While the embodiments describe details of portable media players, the invention is not so limited. The scope of the invention is intended to extend to all media players capable of accessing a playlist or current queue of tracks.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of identifying tracks for playback from a playlist of tracks, the method comprising:
   providing a plurality of tracks in the playlist;
   determining user preference data for each of the plurality of tracks based on the user's conduct when each of the plurality of tracks is accessed for playback, wherein the user preference data is determined automatically from the user's conduct in playing or skipping and not in separately adding or removing at least one of the plurality of tracks;
   providing a reordered listing of tracks in the playlist after at least one track is accessed based on the user preference data;
   associating with each track a track usage attribute reflecting a frequency of access to the track over a predetermined time period; and
   selecting a subset of the playlist as candidates for playback based on the reordered listing of tracks and the track usage attribute.

2. The method as recited in claim 1 wherein the attribute reflects at least one of whether the track has been repeated at least a threshold number of times in the predetermined time period; whether the track has not been accessed in the predetermined time period; and whether the track has been skipped over in the predetermined time period.

3. The method as recited in claim 1 wherein suitable matching values for the track usage attribute are selected by the user in a playback format template selected through a user interface.

4. The method as recited in claim 3 further comprising subjecting the selected subset to random playback.

5. The method as recited in claim 1 wherein the identifying, reordering, and selecting is performed on a portable media player.

6. The method as recited in claim 1 wherein at least two categories corresponding to separate regions in the subset listing are designated for the track usage attribute and the number of tracks meeting each of the at least two categories is determined by the user before selection of the subset.

7. The method as recited in claim 1 wherein the user history in allowing the track to play to completion is deemed approval of the track and the user history in skipping a track is deemed to be a disapproval of the track for setting the user preference data.

8. The method as recited in claim 1 wherein metadata comprises for each of the plurality of tracks in the playlist a ratio of the number of times the track was successfully played to the number of times the track was accessed for playback.

9. The method as recited in claim 1 wherein the tracks comprise audio or video tracks.

10. A portable media player configured to play a plurality of tracks in a random fashion, the player comprising:
    a user interface configured to allow a user to generate a user preference for a track after the track is accessed;
    a memory for storing a plurality of tracks; and a processor configured to perform the following:
    identifying a plurality of tracks in a playlist or queue;
    determining a user preference for each of the plurality of tracks based on the user's conduct during a playback of each of the respective tracks in the plurality, wherein the user preference data is determined automatically from the user's conduct in playing or skipping and not in separately adding or removing at least one of the plurality of tracks;
    reordering the tracks based on the user preference data; and
    selecting a subset of the playlist or queue for playback based on the reordered track arrangement.

11. A method for generating a playlist from a plurality of tracks having an ordering associated with tracks, the method comprising:
    deriving a user preference attribute for each track in the plurality of tracks, wherein the user preference data is determined automatically from the user's conduct in playing or skipping and not in separately adding or removing at least one of the plurality of tracks;
    reordering the tracks based on the automatically derived user preference attributes; and
    selecting a subset of the reordered tracks by applying at least one selection window to the reordered tracks using a second attribute associated with at least some of the plurality, the size of each of the at least one selection window determining the number of tracks in the respective selection window and corresponding to a weighting applied by the user to the category represented by the second attribute.

12. The method as recited in claim 11 wherein the second attribute comprises a playback history identifying a playcount within a predetermined time frame for the tracks.

13. The method as recited in claim 12 further comprising assigning random numbers to each of the tracks in the subset, and wherein playback occurs in accordance with the assigned random numbers.

14. The method as recited in claim 12 wherein the user preference data is derived or modified by the user providing an input on a selection device.

15. The method as recited in claim 12 wherein at least one selection window size is selected by the user selecting a format template defining the relative sizes of each selection window.

16. The method as recited in claim 12 wherein at least one selection window size is selected by the user manually inputting a value.

17. The method as recited in claim 11 wherein the second attribute comprises one of a genre or artist associated with the tracks.

18. The method as recited in claim 11 wherein the reordering associated with the user preference attributes is updated automatically after the user preference data is updated for at least one track.

19. The method as recited in claim 11 wherein the reordering associated with the user preference attributes is updated upon the occurrence of one of the user changing the format template, the track being played back to completion, the track being skipped, and the track being played back.

20. A method of identifying tracks for playback from a playlist of tracks, the method comprising:
    providing a plurality of tracks in the playlist;
    determining user preference data for each of the plurality of tracks based on a user's conduct when each of the plurality of tracks is accessed for playback, wherein the user preference data is determined automatically from the user's conduct in playing or skipping and not in separately adding or removing at least one of the plurality of tracks;
    reordering the plurality of tracks in the playlist based on the determined user preference data; and
    providing the reordered plurality of tracks for playback.

* * * * *